US009520001B2

(12) United States Patent  
Goldman et al.

(10) Patent No.: US 9,520,001 B2  
(45) Date of Patent: Dec. 13, 2016

(54) 3D MODEL ENHANCEMENT

(71) Applicant: Adobe Systems Incorporated, San Jose, CA (US)

(72) Inventors: Daniel Robert Goldman, Seattle, WA (US); Jan Jachnik, London (GB); Linjie Luo, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 284 days.

(21) Appl. No.: 14/159,870

(22) Filed: Jan. 21, 2014

(65) Prior Publication Data

US 2015/0206344 A1    Jul. 23, 2015

(51) Int. Cl.
*G06T 19/20* (2011.01)
*G06T 17/20* (2006.01)

(52) U.S. Cl.
CPC ............ *G06T 17/20* (2013.01); *G06T 19/20* (2013.01); *G06T 2219/2021* (2013.01)

(58) Field of Classification Search
None
See application file for complete search history.

(56) References Cited

U.S. PATENT DOCUMENTS

| | | | | |
|---|---|---|---|---|
| 5,886,702 A | * | 3/1999 | Migdal | G06T 17/20 345/423 |
| 6,130,673 A | * | 10/2000 | Pulli | G06T 17/30 345/423 |
| 6,731,287 B1 | * | 5/2004 | Erdem | G06T 13/40 345/418 |
| 2006/0028466 A1 | * | 2/2006 | Zhou | G06T 17/205 345/420 |

OTHER PUBLICATIONS

Krus, Mike, et al. "Levels of detail & polygonal simplification." Crossroads 3.4 (1997): 13-19.*

* cited by examiner

*Primary Examiner* — Ryan M Gray  
(74) *Attorney, Agent, or Firm* — Kilpatrick Townsend & Stockton LLP

(57) ABSTRACT

One embodiment involves receiving a fine mesh as input, the fine mesh representing a 3-Dimensional (3D) model and comprising fine mesh polygons. The embodiment further involves identifying, based on the fine mesh, near-planar regions represented by a coarse mesh of coarse mesh polygons, at least one of the near-planar regions corresponding to a plurality of the coarse mesh polygons. The embodiment further involves determining a deformation to deform the coarse mesh based on comparing normals between adjacent coarse mesh polygons. The deformation may involve reducing a first angle between coarse mesh polygons adjacent to one another in a same near-planar region. The deformation may additionally or alternatively involve increasing an angle between coarse mesh polygons adjacent to one another in different near-planar regions. The fine mesh can be deformed using the determined deformation.

20 Claims, 9 Drawing Sheets

3D MODEL ENHANCEMENT

TECHNICAL FIELD

This disclosure relates generally to computer-implemented methods and systems and more particularly relates to using 3-dimensional (3D) representations and other models.

BACKGROUND

A 3-dimensional (3D) model can be created in various ways. For example, a 3D model can be created by scanning a person, object, or scene, using a graphical design computer application to create a polygon mesh representation from 2D pictures, images, or other user input, and/or otherwise based on user-provided input. 3D models can be used in many contexts including in 3D printing, simulation, gaming, etc. As one example, a person's head may be scanned to create a 3D model of the person's head that is then printed using a 3D printing technique to form a physical object that resembles the person's head. It is desirable to improve processes that create and use 3D models, for example, by processing 3D model data to improve the appearance of a 3D model and/or a physical object printed or otherwise created based on a 3D model.

SUMMARY

One embodiment involves receiving a fine mesh as input, the fine mesh representing a 3-Dimensional (3D) model and comprising fine mesh polygons. The embodiment further involves identifying, based on the fine mesh, near-planar regions represented by a coarse mesh of coarse mesh polygons, at least one of the near-planar regions corresponding to a plurality of the coarse mesh polygons. The embodiment further involves determining a deformation to deform the coarse mesh based on comparing normals between adjacent coarse mesh polygons, the deformation reducing a first angle between coarse mesh polygons adjacent to one another in a same near-planar region, and deforming the fine mesh using the deformation.

One embodiment involves receiving a fine mesh as input, the fine mesh comprising fine mesh polygons. The embodiment further involves identifying, based on the fine mesh, near-planar regions represented by a coarse mesh of coarse mesh polygons, at least one of the near-planar regions corresponding to a plurality of the coarse mesh polygons. The embodiment further involves determining a deformation to deform the coarse mesh based on comparing normals between adjacent coarse mesh polygons, the deformation increasing an angle between coarse mesh polygons adjacent to one another in different near-planar regions and deforming the fine mesh using the determined deformation.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Various features, embodiments, and advantages of the present disclosure are better understood when the following Detailed Description is read with reference to the accompanying drawings.

DETAILED DESCRIPTION

Computer-implemented systems and methods are disclosed for modifying a 3-dimensional (3D) model. Such modifications can be implemented in processes that create and use 3D models to, for example, improve the appearance of the 3D models, computer graphics involving a 3D model, and/or a physical object printed or otherwise created based on a 3D model.

Certain aspects of certain embodiments disclosed herein are based upon a recognition that traditional sculpture does not necessarily attempt to accurately represent all geometric aspects of faces, heads, trees, and other naturally objects. Instead, sculptors often make some abstractions and exaggerations to emphasize certain aspects. A computer application can provide 3D model manipulations that attempts to modify a 3D model in ways similar to those used by traditional sculptors. This may involve mathematically modeling the intended changes so that the changes can be implemented by a computer.

Traditional sculptors and other artists sometimes employ a "planes of the head" technique to identify features to accentuate and/or smooth features. This technique may involve visually segmenting a face or head into different regions that are called "planes." Such "planes" are not necessarily geometric or mathematical planes, but rather are regions that can be thought of as mostly smooth or single surfaces. For example, a side of the nose may be considered as one region that can be treated uniformly. A sculptor may make the surface of a plane more smooth and uniform than the surface is in real life. As a specific example, a hollowed out cheek may be made more flat. Also, boundaries between planes may be emphasized to bulge out more than in real life, for example, to emphasize a cheek bone or jaw line. In another example, a sculptor may exaggerate the angles between adjacent planes to create a more stern appearance in a male face. As another example, a sculptor may apply smoothing to give a more gentle appearance in a female face. Exaggeration and smoothing based on planes of the face can be implemented in various other ways.

A computer can be used to modify a 3D model using an algorithm that attempts to emulate or loosely mimics such processes mathematically. This may generally involve feature extraction, feature exaggeration and/or smoothing, and model modification.

Figure 1:
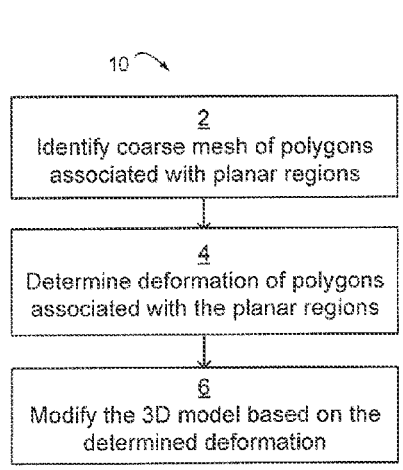
FIG. 1 is a flow chart illustrating an exemplary method of modifying a 3D model according to a non-limiting, exemplary embodiment.
Figure 2:
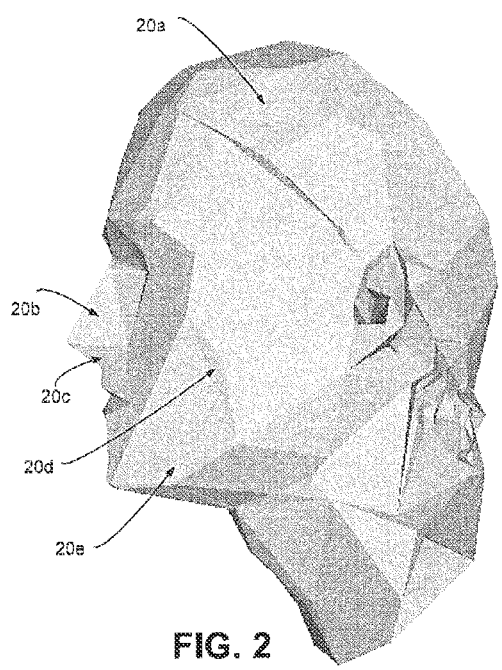
FIG. 2 illustrates graphical representations of polygons identified to represent a head.

FIG. 1 is a flow chart illustrating an exemplary method 10 of modifying a 3D model according to a non-limiting, exemplary embodiment. This method 10 may receive a 3D model as input and identify near-planar regions based on that input, as shown in block 2. Each of the near-planar regions is associated with a respective group of multiple polygons, which in turn are associated with portions of the original 3D model input. FIG. 2 illustrates graphical representations of polygons 20a-e identified for a model of a head. Not all polygons are labeled to avoid cluttering the illustration. A near-planar region may comprise multiple polygons. For example, polygons 20d and 20e may be part of a single near-planar region. In contrast, adjacent polygons, such as polygons 20b and 20c may be associated different near-planar regions.

Returning to FIG. 1, the exemplary method 10 involves determining a deformation of the polygons, as shown in block 4. This may be based on a comparison of the normal of adjacent polygons. It may involve determining how to adjust the vertices of one or more of the polygons. In one embodiment, vertices of polygons associated with the same near-planar region are adjusted to smooth the surface formed by those polygons. In the above example, the vertices of the two polygons associated with the same near-planar region, such as polygons 20d and 20e may be adjusted to form a smoother cheek surface. In one embodiment, vertices of adjacent polygons associated with the different near-planar region are adjusted to exaggerate the intersection formed by those polygons. For example, polygons 20b and 20c may be adjacent to accentuate that intersection. This may involve, for example, changing the vertices to increase the angle formed between the adjacent polygons 20b and 20c. In one embodiment, both smoothing and exaggeration are performed as part of a single process. For example, adjacent polygons associated with the same near-planar region may be smoothed and adjacent polygons associated with different near-planar regions may be exaggerated. Determining smoothings, exaggerations, and other modifications can be determined by optimizing or otherwise using an energy function, for example, with data terms for the vertices and the areas of the polygons.

Next, method 10 modifies the 3D model based on the deformation, as shown in block 6. For example, the original model may be represented by a fine mesh of relatively smaller polygons that are in turn associated with the relatively larger polygons, i.e., the coarse mesh polygons associated with the near-planar regions. The deformation determined for the coarse mesh polygons can be applied to the fine mesh polygons to provide the modified input model. As used herein the phrases "fine mesh" and "coarse mesh" are used as relative terms to one another in that the coarse mesh will have fewer polygons than the fine mesh. In one exemplary embodiment, a fine mesh is formed by thousands of polygons that are in turn represented in a coarse mesh of hundreds of polygons. In another exemplary embodiment, a fine mesh is formed by tens of thousands of polygons that are in turn represented in a coarse mesh of less than one hundred polygons. Other values and ratios between fine and coarse meshes may also apply.

The modification of a 3D model using one or more of the techniques herein may accomplish various objectives. For example, a 3D model may be modified to accentuate certain features, such as portions of the 3D model that appear in areas that protrude and have high curvature. As another example, a 3D model may be modified to smooth out blemishes and other smooth surface imperfections.

Figure 3:
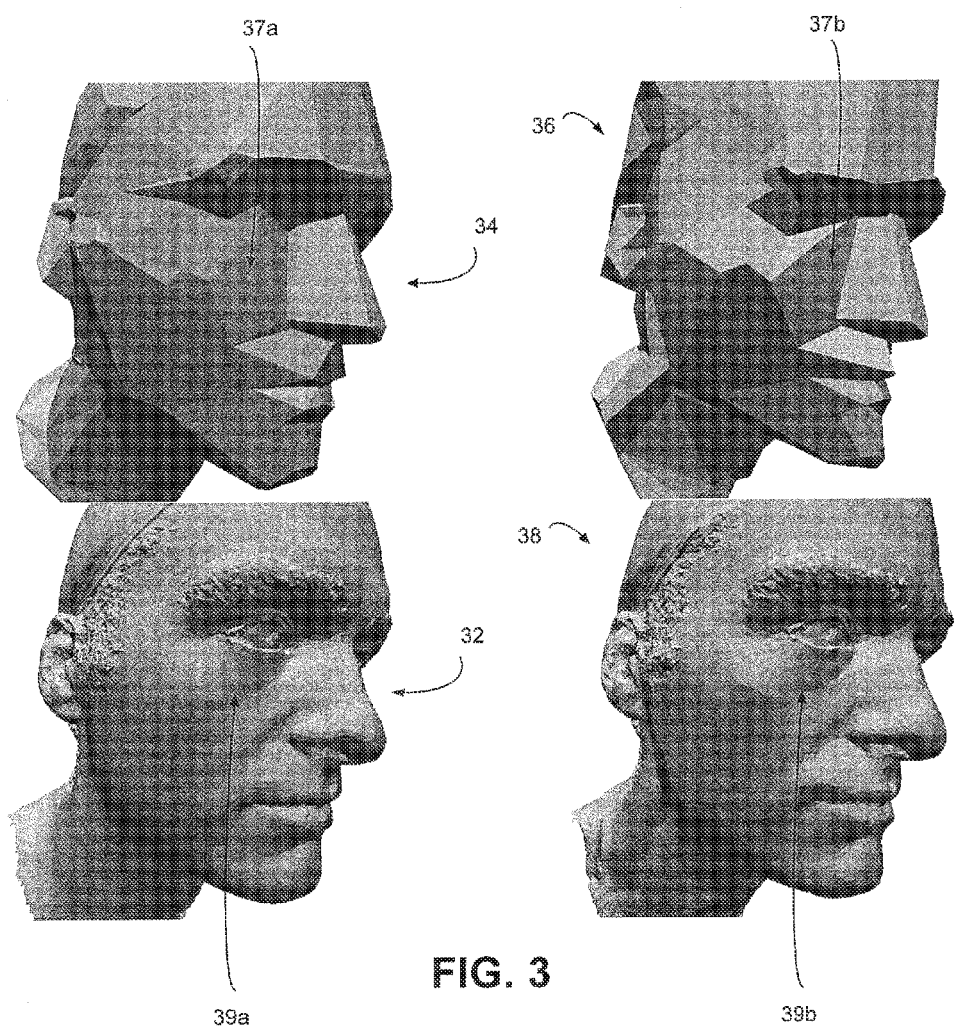
FIG. 3 illustrate modification of a 3D model using the method of FIG. 1.
Figure 4:
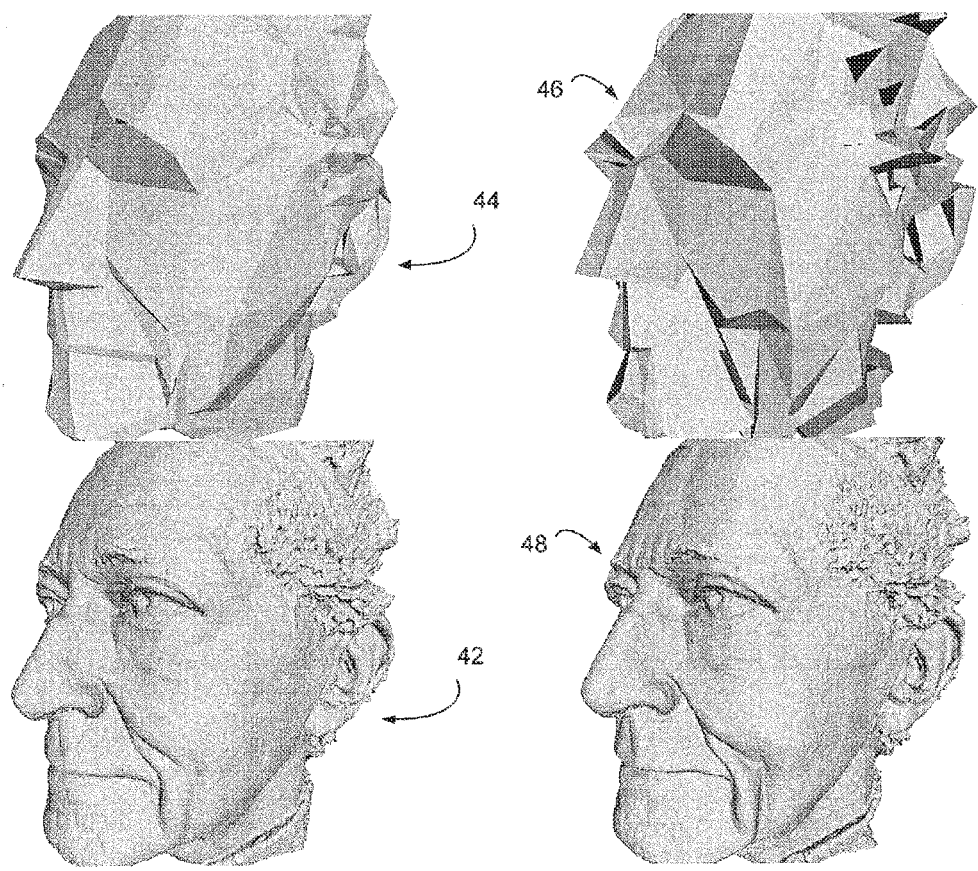
FIG. 4 illustrate modification of another 3D model using the method of FIG. 1.
Figure 5:
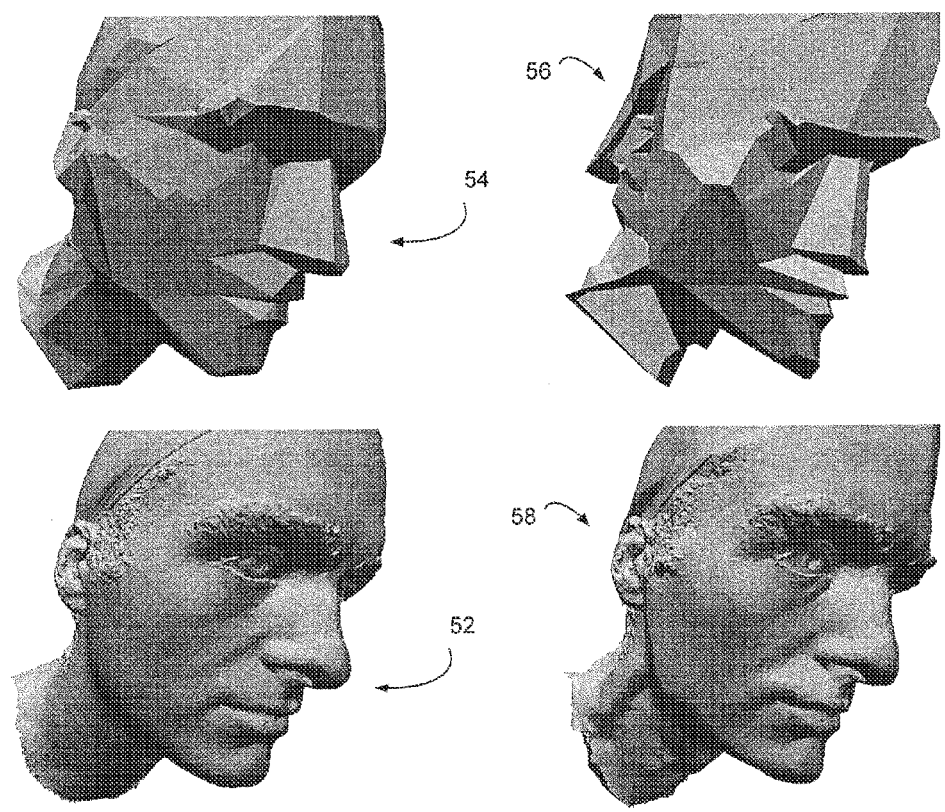
FIG. 5 illustrate modification of another 3D model using the method of FIG. 1.

FIGS. 3-5 illustrate modification of a 3D model using the method of FIG. 1. In FIGS. 3-5, the bottom left models 32, 42, 52 show the respective high resolution input models that are each represented by fine mesh. The upper left models 34, 44, 54 graphically illustrate the output of block 2 of FIG. 1, illustrating coarse meshes of polygons. Each of the polygons in these models is associated with a near-planar region. Some individual near-planar regions are associated with multiple polygons. Adjacent polygons with similar normals may be associated with a single near-planar region and adjacent polygons with different normal may be associated with different near-planar regions. The upper right models 36, 46, 56 graphically illustrate the output of block 4 of FIG. 1, illustrating deformations determined for the polygons of the coarse mesh. The bottom right models 38, 48, and 58 graphically illustrate the output of block 6 of FIG. 1, showing the appearance of the output. In these examples, the output is the deformation applied to the original input models.

In these examples, the deformations determined for the polygons of the coarse mesh are applied to associated portions of the original high resolution input models. Specifically, the polygons of the fine meshes representing the high resolution input models are deformed based on the deformation determined for the corresponding polygons of the coarse meshes. As a specific example, step 2 may determine that a vertex and area of a polygon 37a in the coarse mesh on the left side of a nose in upper left model 34 should be adjusted as shown by polygon 37b shown in upper right model 36. A similar deformation can be applied to multiple smaller polygons in a region 39a of lower left model 32 that are associated therewith, to deform those polygons in region 39b as shown in lower right model 38.

Figure 6:
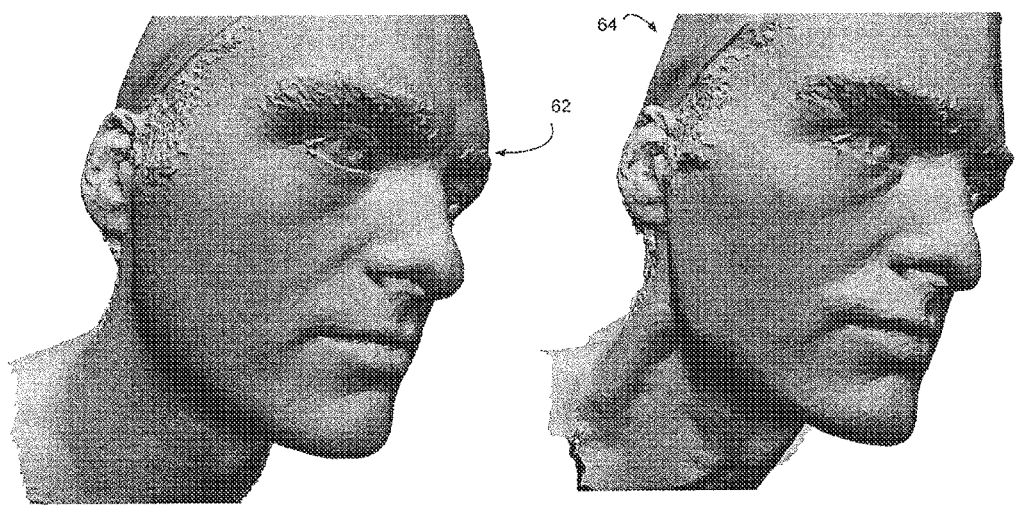
FIG. 6 illustrates modifications of a 3D model to exaggerate certain features and smooth certain features.
Figure 7:
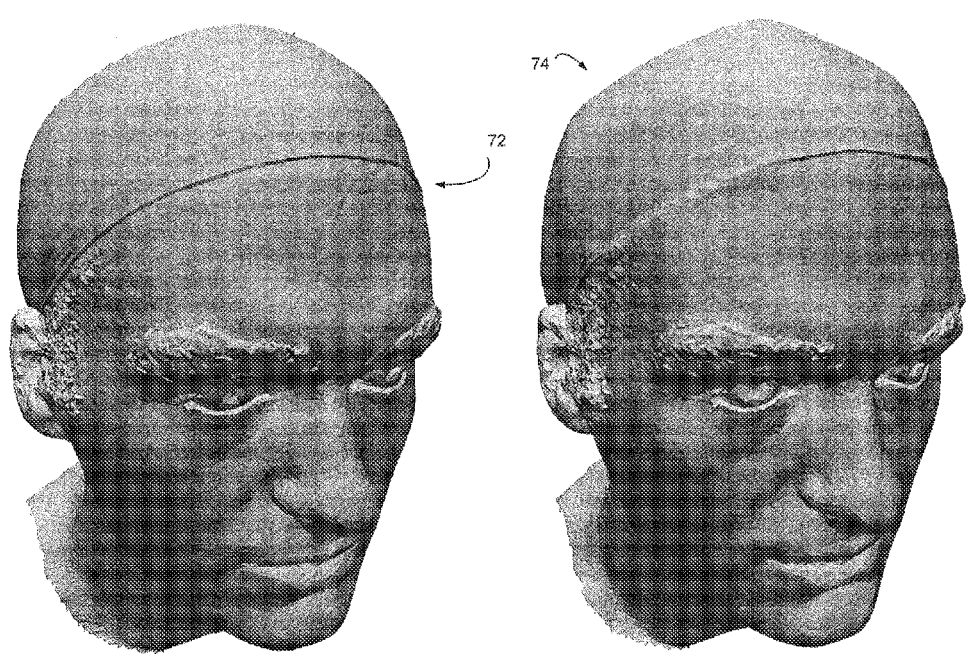
FIG. 7 illustrates modifications of a 3D model to exaggerate certain features and smooth certain features.

FIGS. 6 and 7 illustrate modifications of 3D models to exaggerate certain features and smooth certain features. In FIG. 6, model 62 is modified to provide model 64 in a way that the cheek bone is accentuated, the corner of jaw accentuated, the chin juts out a bit more, and the lips are slightly accentuated so that the upper lip is facing upwards a bit more. In FIG. 7, model 72 is modified to provide model 74 in a way that there is a slight increase in the cheek bone definition and the bone above the temple shows up a bit more.

Figure 8:
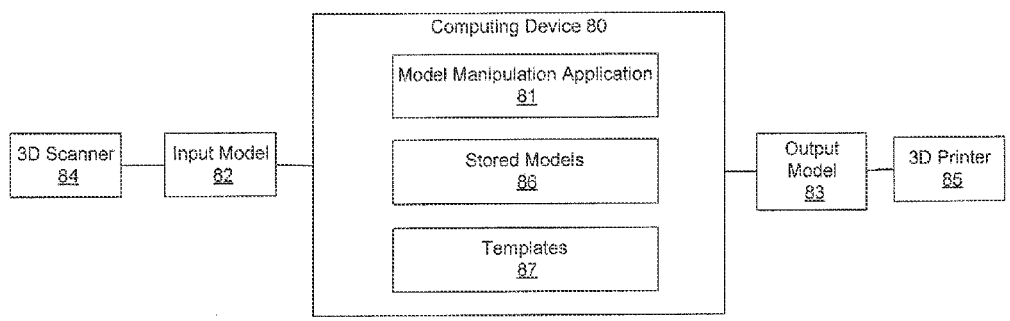
FIG. 8 is a block diagram depicting an example of a model manipulation application that can be executed by a processing device to manipulate a 3D model according to certain exemplary embodiments.

FIG. 8 is a block diagram depicting an example of a model manipulation application 81 that can be executed by a computing device 80 to manipulate an input model 82 to produce an output model 83, according to certain exemplary embodiments. The input model 82 may be received from another computer device through a wired network, a wireless network, or otherwise, or may have been created on the computing device 80. The input model may be received from a 3D scanner such as a scanner 84. The output model 83 may be provided another computing device through a wired network, a wireless network, or otherwise. The output model 83 may be provided to a 3D printer such as 3D printer 85. The computing device 80 can be one or more computers.

The model manipulation application 81 on computing device 80 can perform a process to determine and apply a modification to the input model 82. During such processing the models and information about the models can be stored, for example, as stored models 86 on the computing device 80. Additionally, the model manipulation application may use additional stored information, such as templates 87, to determine and/or apply a modification to the input model 82. Any suitable model manipulation application or other graphics editor program can be used.

Figure 9:
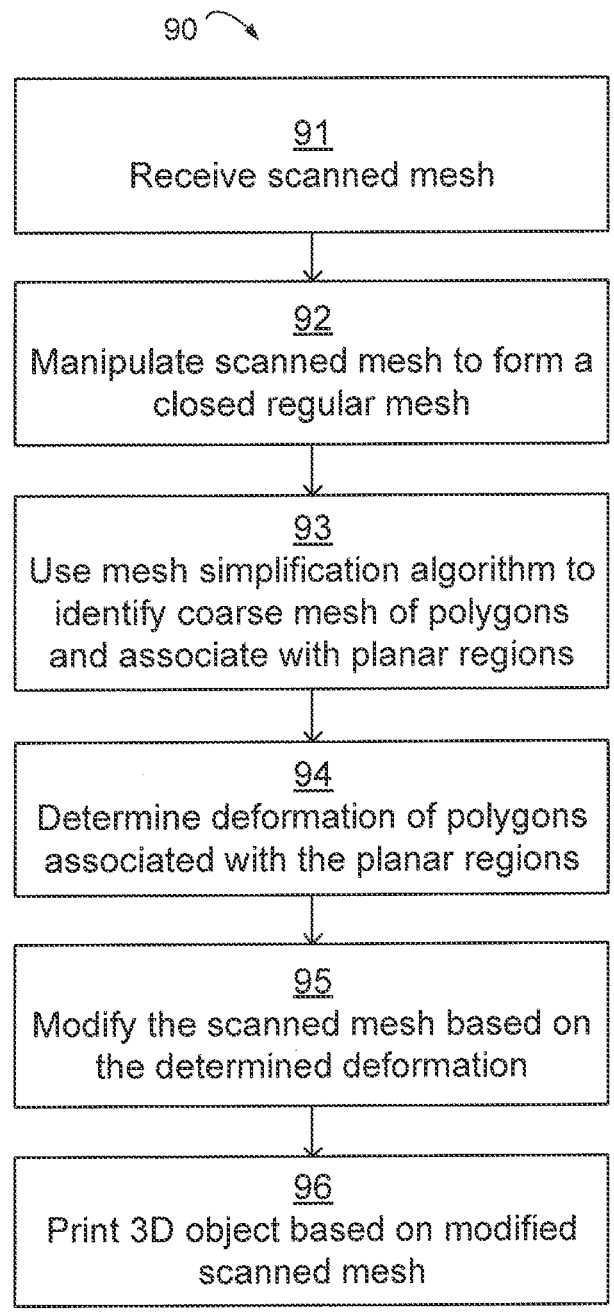
FIG. 9 is a flow chart illustrating an exemplary and non-limiting method of manipulating a model, according to certain embodiments.

FIG. 9 is a flow chart illustrating an exemplary and non-limiting method 90 of manipulating a model. Such a method 90 may be carried out by model manipulation application 80 of FIG. 8 or by any other suitable device or devices. Method 90 begins with receiving a scanned mesh as illustrated in block 91. The scanned mesh may be a high resolution (i.e., fine mesh) with many polygons. For example, a scanned mesh may have hundreds of thousands or even millions of polygons. The scanned mesh is manipulated via one or more mathematical processes to form a closed, regular mesh, as illustrated in block 92.

Method 90 next involves using a mesh simplification algorithm to identify a coarse mesh of polygons associated with near-planar regions, as illustrated in block 93. The mesh simplification algorithm reduces the many (e.g., potentially millions) polygons associated with a fine mesh down to a lesser number of typically larger polygons. Each of the coarse mesh polygons is associated with a near-planar region, as illustrated in block 93. The near-planar regions are conceptually analogous to the planes of the head concept used by artisans. In one embodiment, a variational shape approximation technique is used to identify the near-planar regions that fit closely to the polygons in the fine mesh. A variational shape approximation be performed as described in David Cohen-Steiner, Pierre Alliez, and Mathieu Desbrun, Variational Shape Approximation, ACM Trans. Graph 23 (2004), 905-914, incorporated herein in its entirety by this reference. Such a variational shape approximation technique can use a strategy to try to identify a predetermined or reduced number of planes determined to accurately represents the shape. The number of planes may be a user-specified parameter, allowing the user to control the level of accuracy and abstraction that is used. Additional or alternative mesh simplification algorithms may be used. A template mesh may also be used. For example, a template showing planes of a head could be sized and aligned with the scan and then the planes of that template used in the processes.

A variational shape approximation technique may generate a polygonal mesh and a labeling for each of the polygons in the mesh. The labeling may make available information regarding which polygons represent a single near-planar region. For example, four polygons may represent the forehead because it is not perfectly planar, but in the actual shape approximation those four polygons are approximated by a single plane. In this way, the technique segments a model into near-planar regions and represents those using a coarse polygon mesh. In the neighborhood of a given polygon some belong to the same near-planar regions and others belong to one or more different near-planar regions.

As illustrated in block 94, method 90 next involves determining a deformation of the polygons associated with the near-planar regions. Such deformations can be selected to make certain near-planar regions more planar and/or make certain boundaries more exaggerated/more accentuated, similar to how artisans adjust features of a face based on the planes of the face. Coarse polygons associated with the same near-planar region can be adjusted to provide a more smooth surface, and/or adjacent polygons associated with different near-planar regions can be adjusted to exaggerate the boundary between those polygons. For example, the angle between such adjacent polygons can be increased. The amount of adjustment can, but need not be, based on one or more parameters, for example, identifying a strength of the deformation.

Method 90 further involves modifying the scanned mesh based on the deformation that was determined for the coarse mesh, as shown in block 95. This may involve deforming an original scanned mesh using a transform associated with each near-planar region. The corresponding fine mesh polygons are adjusted based on the transform associated with the respective near-planar region. Such a deformation can additionally or alternatively be performed by the deformation processes described in SUMNER, R. W., AND POPOVIç, J. 2004, Deformation transfer for triangle meshes, ACM Trans. Graph. 23, 3 (August), 399-405, incorporated herein in its entirety by this reference.

As illustrated in block 96, the method 90 can then involve printing a 3D object based on the modified scanned mesh. This can be accomplished using any known to be developed 3D printing technique.

Figure 10:
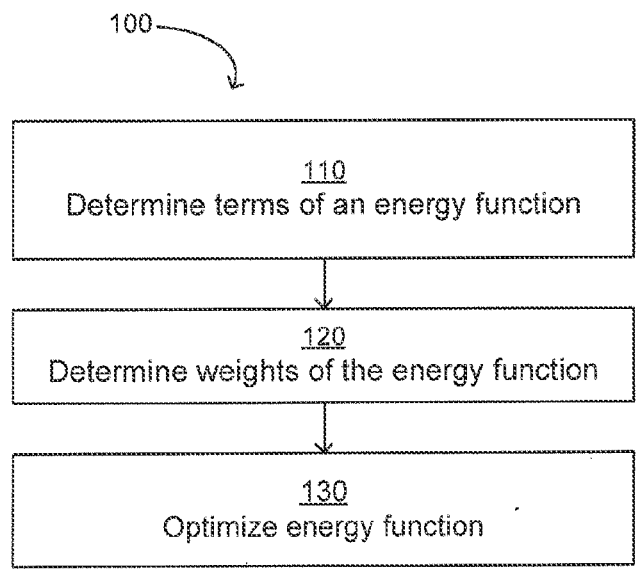
FIG. 10 is a flow chart illustrating an exemplary and non-limiting method of determining a deformation of polygons associated with near-planar regions, according to certain embodiments.

FIG. 10 is a flow chart illustrating an exemplary and non-limiting method 100 of determining a deformation of polygons associated with near-planar regions, according to certain embodiments. The method 100 involves determining terms of an energy function, determining weights of the energy function, and optimizing the energy function, as illustrated by blocks 110, 120, and 130 respectively. In one exemplary embodiment, the terms of the energy function are selected such that one term is selected to keep the mesh similar to its original configuration and the other term selected to identify an appropriate deformation.

The term that identifies the deformation can compare the normals of neighboring polygons to identify the appropriate deformation. Whether polygons have similar normal can be determined by comparing their respective vertices and/or other attributes. Adjacent polygons with similar normal can be smoothed. The terms can be weighted so that adjacent polygons in the same near-planar region are adjusted to reduce the difference between their normals. The terms can be weighted so that adjacent polygons in different near-planar regions are adjusted to increase the differences. For example, for polygons in the same near-planar region, a negative weight can be used to encourage smoothing since the term will get smaller as the normals are made more similar. Conversely, for polygons in different near-planar regions, a positive weight can be used to encourage exaggeration. By using such a weighting technique, the same term call be used in a single optimization process to both make angles between polygons smaller or greater, depending on whether the adjacent polygons are in the same near-planar region or not. In an alternative embodiment, two separate terms are used: one term to decrease angles between adjacent polygons in the same near-planar region and one term to increase the angles between adjacent polygons in different near-planar regions. Additional alternative formulations are of course also possible.

An exemplary energy function is provided below:

$$E(v) = \sum_{e(f_1, f_2) \in M_c \setminus \partial M_c} \omega_e \hat{n}_{f1} \cdot \hat{n}_{f2} + \frac{\lambda_v}{2} \sum_{v \in M_c} \|v - v_0\|_2^2 + \lambda_A \sum_{f \in M_c} \Psi(A_f, A_f^0)$$

In the exemplary equation above, the first term of the energy function is based on a comparison of normals summed over all edges in the polygon mesh between neighboring faces and weighted using weight $w_e$. The weight is per edge and can be altered per edge. A positive weight corresponds to exaggerating the angle and a negative weight reduces the angle for smoothing. The size of the weight can alter the relative strength of the exaggeration or smoothing. As each near-planar region is made up of a number of polygons, the optimization smoothes the edges within the near-planar region and exaggerates the edges on the boundaries between near-planar regions. The second term of the energy function above is a vertex term and is written as a deviation of vertices from original location v-vo. By optimizing over the vertices of the coarse mesh, a correspondence between the exaggerated features and the original mesh is maintained. The third term of the energy function above is an area term selected to keep areas of the triangles similar to those of the original. Specifically, the third term helps with degeneracies that could occur if the polygon areas drop down to zero. In an alternative embodiment, this may be formulated using a least squares term on vertices location and a non-linear least square solver may be used to potentially improve accuracy, speed, etc. This example provides an exemplary energy function. Alternative energy functions using fewer terms, more terms, and/or alternative terms may be additionally or alternatively be used. Alternative function types and/or deformation determination techniques may also additionally or alternatively be used.

Modifying a scanned mesh based on a deformation can be performed in a variety of ways. In one embodiment, modifying the scanned mesh can involve the use of a rotation matrix. This may involve using normal deformations determined for the coarse mesh to generate a rotation matrix which transforms the old normal to the new normal. The corresponding rotation can then be applied to every corresponding face in the fine resolution mesh under the constraints that the mesh still remains connected. This can involve optimizing an energy function which attempts to do so constrained by a data term that keeps edge length similar to original mesh so that triangles do not collapse:

$$E = -\sum_{f \in M} \langle \hat{n}_f, \hat{n}_f^{target} \rangle + \lambda_e \sum_{e \in M} \begin{cases} \frac{|e_0|}{|e|}(|e| - |e_0|)^2 & \text{if } |e| \le |e_0| \\ (|e| - |e_0|)^2 & \text{if } |e| > |e_0| \end{cases}$$

By specifying the rotation separate from an additional term to maintain edge length, control over the fidelity of the triangles to their original shape is maintained. It is also possible to include a translation part, which can be weighted differently. In an alternative embodiment, modifying a scanned mesh based on a deformation can involve an affine transformation.

The techniques disclosed herein are illustrated with examples involving human faces and heads. However, the techniques can be used outside of heads and faces and are generally applicable to anything that is in its natural form, including but not limited to, tree trunks, animals, etc.

Model modification functionality can implemented in a variety of types of software applications and devices. The techniques disclosed herein could be used to extend the functionality of photo editing software or to software used to create 3D computing and gaming environments, as non-limiting examples. As another example, model modification software may be incorporated into a camera or 3d scanning device.

Certain embodiment disclosed herein relate to the use of two scales: an original, fine mesh and a coarse mesh. However, an alternative embodiment could use a hierarchical approach to exaggerate features of different scales using any number of suitable scales.

Figure 11:
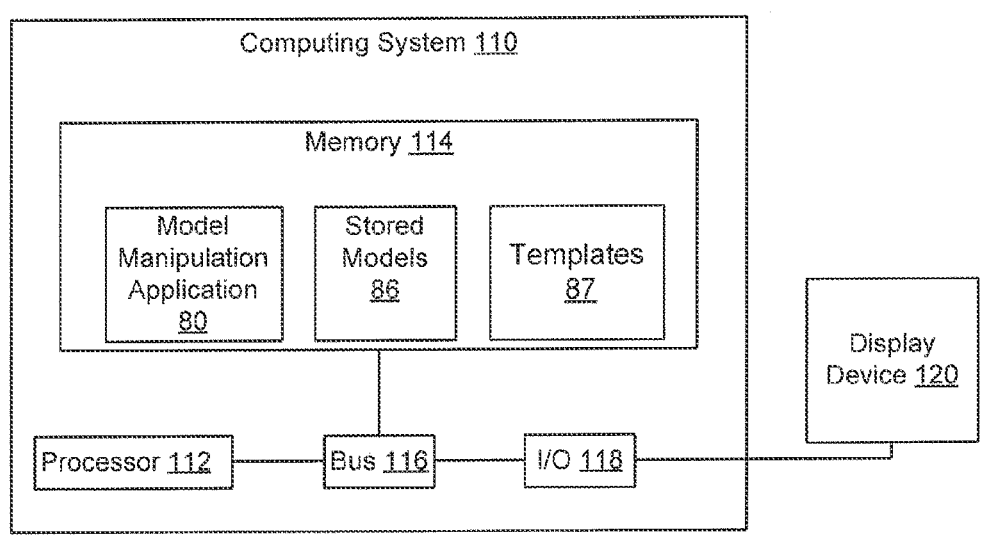
FIG. 11 is a block diagram depicting an example of a computing system for implementing certain embodiments.

Any suitable computing system can be used to execute the model manipulation application 80. FIG. 11 is a block diagram depicting an example of a computing system 800 for implementing certain embodiments.

The computing system 110 can include a processor 112 that is communicatively coupled to a memory 114 and that executes computer-executable program instructions and/or accesses information stored in the memory 114. The processor 112 may comprise a microprocessor, an application-specific integrated circuit ("ASIC"), a state machine, or other processing device. The processor 112 can include any of a number of processing devices, including one. Such a processor can include or may be in communication with a computer-readable medium storing instructions that, when executed by the processor 112, cause the processor to perform the operations described herein.

The memory 114 can include any suitable computer-readable medium. The computer-readable medium can be include any electronic, optical, magnetic, or other storage device capable of providing a processor with computer-readable instructions or other program code. Non-limiting examples of a computer-readable medium include a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Peri, JavaScript, and ActionScript.

The computing system 110 may also comprise a number of external or internal devices such as input or output devices. For example, the computing system 110 is shown with an input/output ("I/O") interface 118 and a display device 120. A bus 116 can also be included in the computing system 110. The bus 116 can communicatively couple one or more components of the computing system 110.

The computing system 110 can include any suitable computing device for executing the model manipulation application 80. Non-limiting examples of a computing device include a desktop computer, a tablet computer, a laptop computer, a camera, a scanner, or any other computing device suitable for manipulating a model.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
receiving a fine mesh as input, the fine mesh representing a 3-Dimensional (3D) model and comprising a first plurality of fine-mesh polygons, a second plurality of fine-mesh polygons, and a third plurality of fine-mesh polygons;
grouping the first plurality of fine-mesh polygons, the second plurality of fine-mesh polygons, and the third plurality of fine-mesh polygons into a first near-planar region of a coarse mesh and a second near-planar region of the coarse mesh, the first near-planar region comprising a first coarse-mesh polygon corresponding to the first plurality of fine-mesh polygons, the second near-planar region comprising a second coarse-mesh polygon corresponding to the second plurality of fine-mesh polygons and a third coarse-mesh polygon corresponding to the third plurality of fine-mesh polygons;
applying a deformation to the coarse mesh, wherein applying the deformation the coarse mesh comprises:
increasing an angle between the first coarse-mesh polygon and the second coarse-mesh polygon based on the first coarse-mesh polygon being in the first near-planar region and the second coarse-mesh polygon being in the second near-planar region, and
decreasing an angle between the second coarse-mesh polygon and the third coarse-mesh polygon based on the second coarse-mesh polygon and the third coarse-mesh polygon being in the second near-planar region; and
transforming the deformation into a modification for the fine mesh; and
applying the modification to at least some of the first plurality of fine-mesh polygons, at least some of the second plurality of fine-mesh polygons, and at least some of the third plurality of fine-mesh polygons.

2. The method of claim 1, wherein applying the deformation comprises:
accessing an energy function having an output based on positions of vertices of the coarse mesh, wherein a first term of the energy function (i) relates a normal of the first coarse-mesh polygon to a normal of the second coarse-mesh polygon and (ii) has a first weight causing an increase in the angle between the first coarse-mesh polygon and the second coarse-mesh polygon, wherein a second term of the energy function (i) relates the normal of the second coarse-mesh polygon to a normal of the third coarse-mesh polygon and (ii) has a second weight causing an decrease in the angle between the second coarse-mesh polygon and the third coarse-mesh polygon; and
minimizing the output of the energy function, wherein minimizing the output comprises modifying a subset of the positions of vertices.

3. The method of claim 2, wherein the energy function also includes a term that maintains a threshold similarity of the coarse mesh relative to an original configuration of the coarse mesh when the energy function is minimized.

4. The method of claim 1, wherein transforming the deformation into the modification for the fine mesh comprises:
generating a rotation matrix by comparing a normal of each coarse-mesh polygon prior to the deformation being applied and a normal of each coarse-mesh polygon subsequent to the deformation being applied, wherein the rotation matrix transforms the normal prior to the deformation being applied into the normal subsequent to the deformation being applied; and
applying rotations in the rotation matrix to corresponding fine-mesh polygons in the fine mesh.

5. The method of claim 1, wherein applying the deformation comprises optimizing an energy function using a term weighted for a particular edge between coarse-mesh polygons adjacent to one another, wherein optimizing the energy function causes at least one of:
accentuating a first feature in the 3D model that corresponds to the first coarse-mesh polygon and the second coarse-mesh polygon by increasing the angle between the first coarse-mesh polygon and the second coarse-mesh polygon; or
smoothing a second feature in the 3D model that corresponds to the second coarse-mesh polygon and the third coarse-mesh polygon by decreasing the angle between the second coarse-mesh polygon and the third coarse-mesh polygon.

6. The method of claim 1, wherein transforming the deformation into the modification and applying the modification comprises applying a rotation and controlling polygon edge length to avoid polygon collapse.

7. The method of claim 1, wherein transforming the deformation into the modification and applying the modification comprises applying a rotation matrix to polygons in the fine mesh.

8. The method of claim 1, wherein the first near-planar region, the second near-planar region, and the third near-planar region approximate planes of a naturally occurring object.

9. A system comprising:
a processor; and
a non-transitory computer-readable medium communicatively coupled to the processor, wherein the processor is configured for executing instructions stored in the non-transitory computer-readable medium to perform operations comprising:
receiving a fine mesh as input, the fine mesh representing a 3-Dimensional (3D) model and comprising a first plurality of fine-mesh polygons, a second plurality of fine-mesh polygons, and a third plurality of fine-mesh polygons,
grouping the first plurality of fine-mesh polygons, the second plurality of fine-mesh polygons, and the third plurality of fine-mesh polygons into a first near-planar region of a coarse mesh and a second near-planar region of the coarse mesh, the first near-planar region comprising a first coarse-mesh polygon corresponding to the first plurality of fine-mesh polygons, the second near-planar region comprising a second coarse-mesh polygon corresponding to the second plurality of fine-mesh polygons and a third coarse-mesh polygon corresponding to the third plurality of fine-mesh polygons,
applying a deformation to the coarse mesh, wherein applying the deformation the coarse mesh comprises:
increasing an angle between the first coarse-mesh polygon and the second coarse-mesh polygon based on the first coarse-mesh polygon being in the first near-planar region and the second coarse-mesh polygon being in the second near-planar region, and
decreasing an angle between the second coarse-mesh polygon and the third coarse-mesh polygon based on the second coarse-mesh polygon and the third coarse-mesh polygon being in the second near-planar region, and
transforming the deformation into a modification for the fine mesh, and
applying the modification to at least some of the first plurality of fine-mesh polygons, at least some of the second plurality of fine-mesh polygons, and at least some of the third plurality of fine-mesh polygons.

10. The system of claim 9, wherein applying the deformation comprises:
accessing an energy function having an output based on positions of vertices of the coarse mesh, wherein a first term of the energy function (i) relates a normal of the first coarse-mesh polygon to a normal of the second coarse-mesh polygon and (ii) has a first weight causing an increase in the angle between the first coarse-mesh polygon and the second coarse-mesh polygon, wherein a second term of the energy function (i) relates the normal of the second coarse-mesh polygon to a normal of the third coarse-mesh polygon and (ii) has a second weight causing an decrease in the angle between the second coarse-mesh polygon and the third coarse-mesh polygon; and
minimizing the output of the energy function, wherein minimizing the output comprises modifying a subset of the positions of vertices.

11. The system of claim 9, wherein the energy function also includes a term that maintains a threshold similarity of the coarse mesh relative to an original configuration of the coarse mesh when the energy function is minimized.

12. The system of claim 9, wherein transforming the deformation into the modification for the fine mesh comprises:
generating a rotation matrix by comparing a normal of each coarse-mesh polygon prior to the deformation being applied and a normal of each coarse-mesh polygon subsequent to the deformation being applied, wherein the rotation matrix transforms the normal prior to the deformation being applied into the normal subsequent to the deformation being applied; and
applying rotations in the rotation matrix to corresponding fine-mesh polygons in the fine mesh.

13. The system of claim 9, wherein applying the deformation comprises optimizing an energy function using a term weighted for a particular edge between coarse-mesh polygons adjacent to one another, wherein optimizing the energy function causes at least one of:
accentuating a first feature in the 3D model that corresponds to the first coarse-mesh polygon and the second coarse-mesh polygon by increasing the angle between the first coarse-mesh polygon and the second coarse-mesh polygon; or
smoothing a second feature in the 3D model that corresponds to the second coarse-mesh polygon and the third coarse-mesh polygon by decreasing the angle between the second coarse-mesh polygon and the third coarse-mesh polygon.

14. The system of claim 9, wherein transforming the deformation into the modification and applying the modification comprises applying a rotation and controlling polygon edge length to avoid polygon collapse.

15. A non-transitory computer-readable medium having instructions stored thereon that are executable by a processing device, the instructions comprising:
instructions for receiving a fine mesh as input, the fine mesh representing a 3-Dimensional (3D) model and comprising a first plurality of fine-mesh polygons, a second plurality of fine-mesh polygons, and a third plurality of fine-mesh polygons;
instructions for grouping the first plurality of fine-mesh polygons, the second plurality of fine-mesh polygons, and the third plurality of fine-mesh polygons into a first near-planar region of a coarse mesh and a second near-planar region of the coarse mesh, the first near-planar region comprising a first coarse-mesh polygon corresponding to the first plurality of fine-mesh polygons, the second near-planar region comprising a second coarse-mesh polygon corresponding to the second plurality of fine-mesh polygons and a third coarse-mesh polygon corresponding to the third plurality of fine-mesh polygons;
instructions for applying a deformation to the coarse mesh, wherein applying the deformation the coarse mesh comprises:
increasing an angle between the first coarse-mesh polygon and the second coarse-mesh polygon based on the first coarse-mesh polygon being in the first near-planar region and the second coarse-mesh polygon being in the second near-planar region, and decreasing an angle between the second coarse-mesh polygon and the third coarse-mesh polygon based on the second coarse-mesh polygon and the third coarse-mesh polygon being in the second near-planar region, and transforming the deformation into a modification for the fine mesh; and instructions for applying the modification to at least some of the first plurality of fine-mesh polygons, at least some of the second plurality of fine-mesh polygons, and at least some of the third plurality of fine-mesh polygons.

16. The non-transitory computer-readable medium of claim 15, wherein applying the deformation comprises:

accessing an energy function having an output based on positions of vertices of the coarse mesh, wherein a first term of the energy function (i) relates a normal of the first coarse-mesh polygon to a normal of the second coarse-mesh polygon and (ii) has a first weight causing an increase in the angle between the first coarse-mesh polygon and the second coarse-mesh polygon, wherein a second term of the energy function (i) relates the normal of the second coarse-mesh polygon to a normal of the third coarse-mesh polygon and (ii) has a second weight causing an decrease in the angle between the second coarse-mesh polygon and the third coarse-mesh polygon; and minimizing the output of the energy function, wherein minimizing the output comprises modifying a subset of the positions of vertices.

17. The non-transitory computer-readable medium of claim 16, wherein the energy function also includes a term that maintains a threshold similarity of the coarse mesh relative to an original configuration of the coarse mesh when the energy function is minimized.

18. The non-transitory computer-readable medium of claim 15, wherein transforming the deformation into the modification for the fine mesh comprises:

generating a rotation matrix by comparing a normal of each coarse-mesh polygon prior to the deformation being applied and a normal of each coarse-mesh polygon subsequent to the deformation being applied, wherein the rotation matrix transforms the normal prior to the deformation being applied into the normal subsequent to the deformation being applied; and applying rotations in the rotation matrix to corresponding fine-mesh polygons in the fine mesh.

19. The non-transitory computer-readable medium of claim 15, wherein applying the deformation comprises optimizing an energy function using a term weighted for a particular edge between coarse-mesh polygons adjacent to one another, wherein optimizing the energy function causes at least one of:

accentuating a first feature in the 3D model that corresponds to the first coarse-mesh polygon and the second coarse-mesh polygon by increasing the angle between the first coarse-mesh polygon and the second coarse-mesh polygon; or smoothing a second feature in the 3D model that corresponds to the second coarse-mesh polygon and the third coarse-mesh polygon by decreasing the angle between the second coarse-mesh polygon and the third coarse-mesh polygon.

20. The non-transitory computer-readable medium of claim 15, wherein transforming the deformation into the modification and applying the modification comprises applying a rotation and controlling polygon edge length to avoid polygon collapse.

* * * * *